US011872170B2

(12) United States Patent
Chepurny

(10) Patent No.: US 11,872,170 B2
(45) Date of Patent: Jan. 16, 2024

(54) PORTABLE PATIENT LIFT SYSTEM

(71) Applicant: AMICO MOBILITY SOLUTIONS CORP., Richmond Hill (CA)

(72) Inventor: Mark P. Chepurny, Bradford (CA)

(73) Assignee: Amico Mobility Solutions Corp., Richmond Hill (CA)

(*) Notice: Subject to any disclaimer, the term of this patent is extended or adjusted under 35 U.S.C. 154(b) by 72 days.

(21) Appl. No.: 16/764,733

(22) PCT Filed: Nov. 15, 2018

(86) PCT No.: PCT/CA2018/051450
§ 371 (c)(1),
(2) Date: May 15, 2020

(87) PCT Pub. No.: WO2019/095062
PCT Pub. Date: May 23, 2019

(65) Prior Publication Data

US 2020/0360212 A1 Nov. 19, 2020

Related U.S. Application Data

(60) Provisional application No. 62/586,242, filed on Nov. 15, 2017.

(51) Int. Cl.
*A61G 7/10* (2006.01)

(52) U.S. Cl.
CPC ......... *A61G 7/1015* (2013.01); *A61G 7/1061* (2013.01); *A61G 2203/10* (2013.01)

(58) Field of Classification Search
CPC ................ A61G 7/1015; A61G 7/1061; A61G 2203/10; A61G 7/10

(Continued)

(56) References Cited

U.S. PATENT DOCUMENTS 4,372,452 A * 2/1983 McCord .................. B66C 19/00 212/331
5,038,425 A * 8/1991 Merry .................. A61G 7/1074 D12/128

(Continued)

FOREIGN PATENT DOCUMENTS

CA 2864970 A1 * 8/2013 ............... A61G 7/10
CA 3001069 4/2017
JP 2004243107 9/2004

OTHER PUBLICATIONS

International Search Report & Written Opinion, PCT/CA2018/051450, dated Jan. 24, 2019.

*Primary Examiner* — Justin C Mikowski
*Assistant Examiner* — Luke Hall
(74) *Attorney, Agent, or Firm* — Smart & Biggar LP

(57) ABSTRACT

Disclosed herein is a patient lift system. The patient lift system includes a housing enclosing a frame, a geared spool mounted within the frame, a strap, a first carry bar and a second carry bar. The first carry bar attaches to the frame and extends external to the housing. The first carry bar encloses an electric motor having a drive shaft. The drive shaft is associated with a gear arranged to cooperate with the geared spool to, responsive to activation of the motor, turn the geared spool, thereby altering an amount of strap on the geared spool, thereby altering a distance between the housing and the connector. The second carry bar attaches to the frame and extends external to the housing. The second carry bar encloses a battery to provide electrical power to the electric motor.

22 Claims, 4 Drawing Sheets

(58) Field of Classification Search
USPC .............................................................. 5/83.1
See application file for complete search history.

(56) References Cited

U.S. PATENT DOCUMENTS

| | | | | |
|---|---|---|---|---|
| 5,490,293 | A * | 2/1996 | Nilsson | A61G 7/1051 212/331 |
| 5,553,335 | A * | 9/1996 | Lahtinen | A61G 7/1015 5/88.1 |
| 9,757,297 | B2 * | 9/2017 | Arespong | A61G 7/1061 |
| 2003/0200607 | A1 * | 10/2003 | Faucher | B66D 3/26 5/81.1 R |
| 2004/0217078 | A1 * | 11/2004 | Keane | B66D 3/26 212/71 |
| 2009/0077737 | A1 * | 3/2009 | Dyhr | A61G 7/1015 5/85.1 |
| 2010/0043140 | A1 * | 2/2010 | Chepurny | B66D 3/18 5/85.1 |
| 2011/0185495 | A1 * | 8/2011 | Robert-Jones | A61G 7/1015 5/83.1 |
| 2011/0219538 | A1 * | 9/2011 | McWattie | A61G 7/1061 5/87.1 |
| 2012/0011650 | A1 * | 1/2012 | Chepurny | A61G 7/1067 5/85.1 |
| 2012/0018689 | A1 * | 1/2012 | Chepurny | A61G 7/1015 254/342 |
| 2013/0019401 | A1 * | 1/2013 | Faucher | A61G 7/1042 5/85.1 |
| 2014/0115778 | A1 * | 5/2014 | Ng | A61G 7/1061 5/83.1 |
| 2014/0143952 | A1 * | 5/2014 | Trepanier | A61G 7/1001 5/83.1 |
| 2014/0265391 | A1 * | 9/2014 | Karlsson | A61G 7/1069 294/81.1 |
| 2017/0326013 | A1 * | 11/2017 | Hyde | A61G 7/1065 |

* cited by examiner

PORTABLE PATIENT LIFT SYSTEM

FIELD

The present application relates generally to patient lifts and, more specifically, to a portable patient lift system.

BACKGROUND

Patient lift systems are known. For example, companies such as V. Guldmann A/S of Arhus, Denmark, Prism Medical Canada of Concord, Canada, the ArjoHuntleigh portion of the Getinge Group AB of Getinge, Sweden, the Liko portion of Hill-Rom, Inc. of Batesville, Indiana, and Tollos, Inc. of Barrie, Canada are known to manufacture and distribute patient lift systems. The known patient lift systems are typically designed to be attached to a track fastened to the ceiling of a room. Once installed, the patient lift system is suspended from the track. The track may be seen to provide a range of possible locations.

BRIEF DESCRIPTION OF THE DRAWINGS

Reference will now be made, by way of example, to the accompanying drawings which show example implementations; and in which.

DETAILED DESCRIPTION

A patient lift system described herein may be seen to help lift and mobilize a disabled person in a home or in an institution with minimal effort from a caregiver. The patient lift system includes a lift, a carry bar and a hand control. The lift, the carry bar and the hand control have shapes and features that may be seen to facilitate quick and easy cleaning. Notably, gaps have been minimized for infection control purposes.

According to an aspect of the present disclosure, there is provided a patient lift system. The patient lift system includes a housing enclosing a frame, a geared spool mounted within the frame, a strap extending external to the housing, attached, at a first end, to the geared spool and attached, at a second end, to a connector, a first carry bar and a second carry bar. The first carry bar is attached to the frame and extending external to the housing, the first carry bar enclosing an electric motor having a drive shaft, the dive shaft associated with a gear arranged to cooperate with the geared spool to, responsive to activation of the motor, turn the geared spool, thereby altering an amount of strap on the geared spool, thereby altering a distance between the housing and the connector. The second carry bar is attached to the frame and extending external to the housing, the second carry bar enclosing a battery to provide electrical power to the electric motor.

According to an aspect of the present disclosure, there is provided a method of manufacturing a patient lift system. The method includes mounting a geared spool within a frame, attaching a strap, at a first end, to the geared spool, attaching the strap, at a second end, to a connector, attaching a first carry bar to the frame, installing, enclosed within the first carry bar, an electric motor having a drive shaft, mounting a gear to the drive shaft, arranging the gear to cooperate with the geared spool to, responsive to activation of the motor, turn the geared spool, thereby altering an amount of the strap on the geared spool, thereby altering a distance between the frame and the connector, attaching a second carry bar to the frame and installing, enclosed within the second carry bar, a battery to provide electrical power to the electric motor.

Other aspects and features of the present disclosure will become apparent to those of ordinary skill in the art upon review of the following description of specific implementations of the disclosure in conjunction with the accompanying figures.

Figure 1:
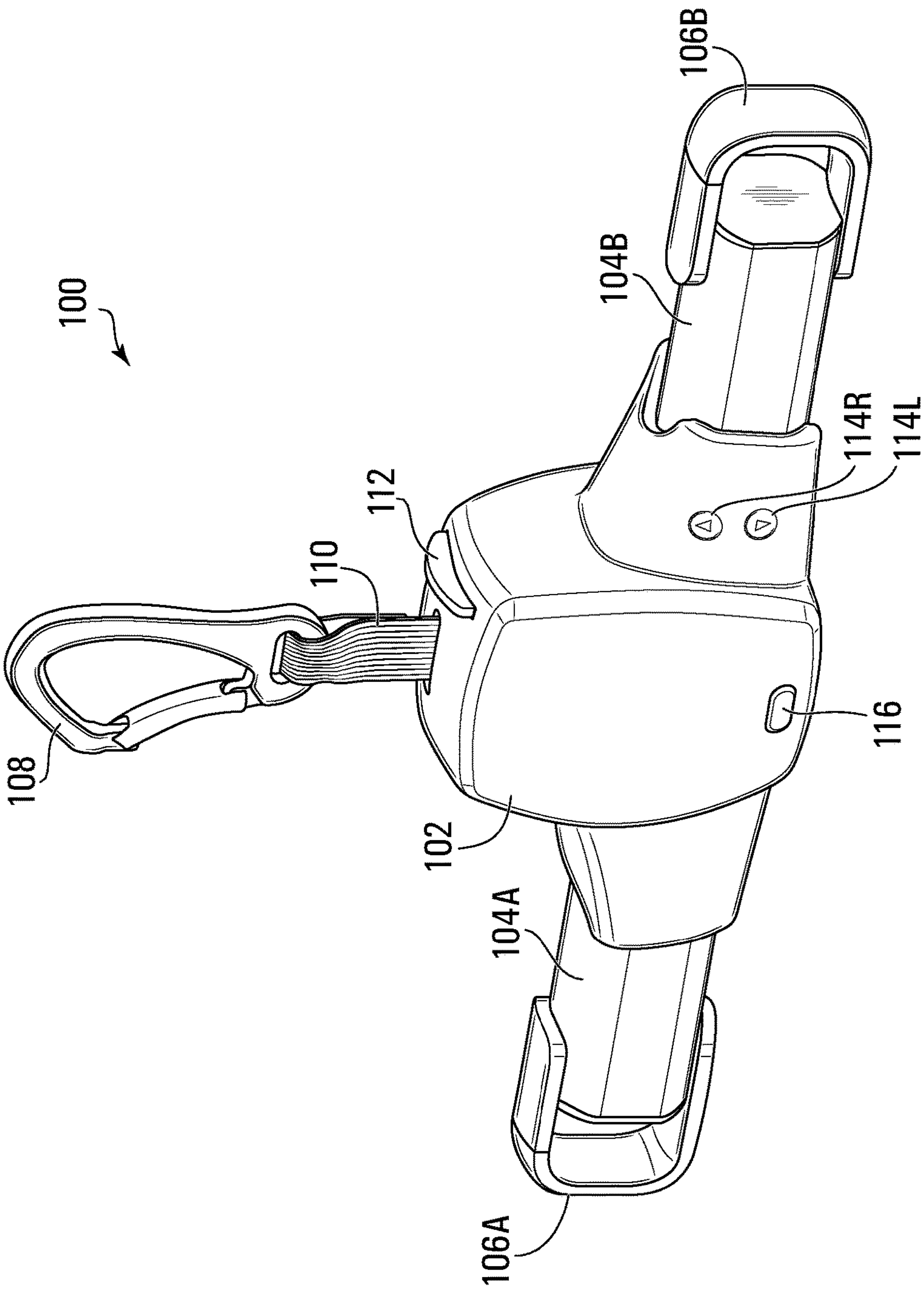
FIG. 1 illustrates, in an anterior perspective view, a patient lift system having a housing a carry bars in accordance with an aspect of the present application.

FIG. 1 illustrates, in an anterior perspective view, a patient lift system 100. The patient lift system 100 includes a housing 102 that encloses a frame (not shown in FIG. 1). The housing 102 includes push button controls: a housing "raise" button 114R; and a housing "lower" button 114L. The housing 102 also includes an indicator 116.

The patient lift system 100 includes a carry bar. The carry bar has a first carry bar arm 104A and a second carry bar arm 104B (collectively or individually 104). The carry bar arms 104 connect to the frame, at a proximal end, inside the housing 102. The first carry bar arm 104A has a first carry bar hook 106A positioned at its distal end. Similarly, the second carry bar arm 104B has a second carry bar hook 106B positioned at its distal end.

The patient lift system 100 further includes a carabiner 108. The patient lift system 100 also includes a strap 110 that attaches the carabiner 108 to the frame inside the housing 102. The strap 110 may, for example, be formed from polyester.

The housing features a slot through which extends an emergency stop plate 112.

Figure 2:
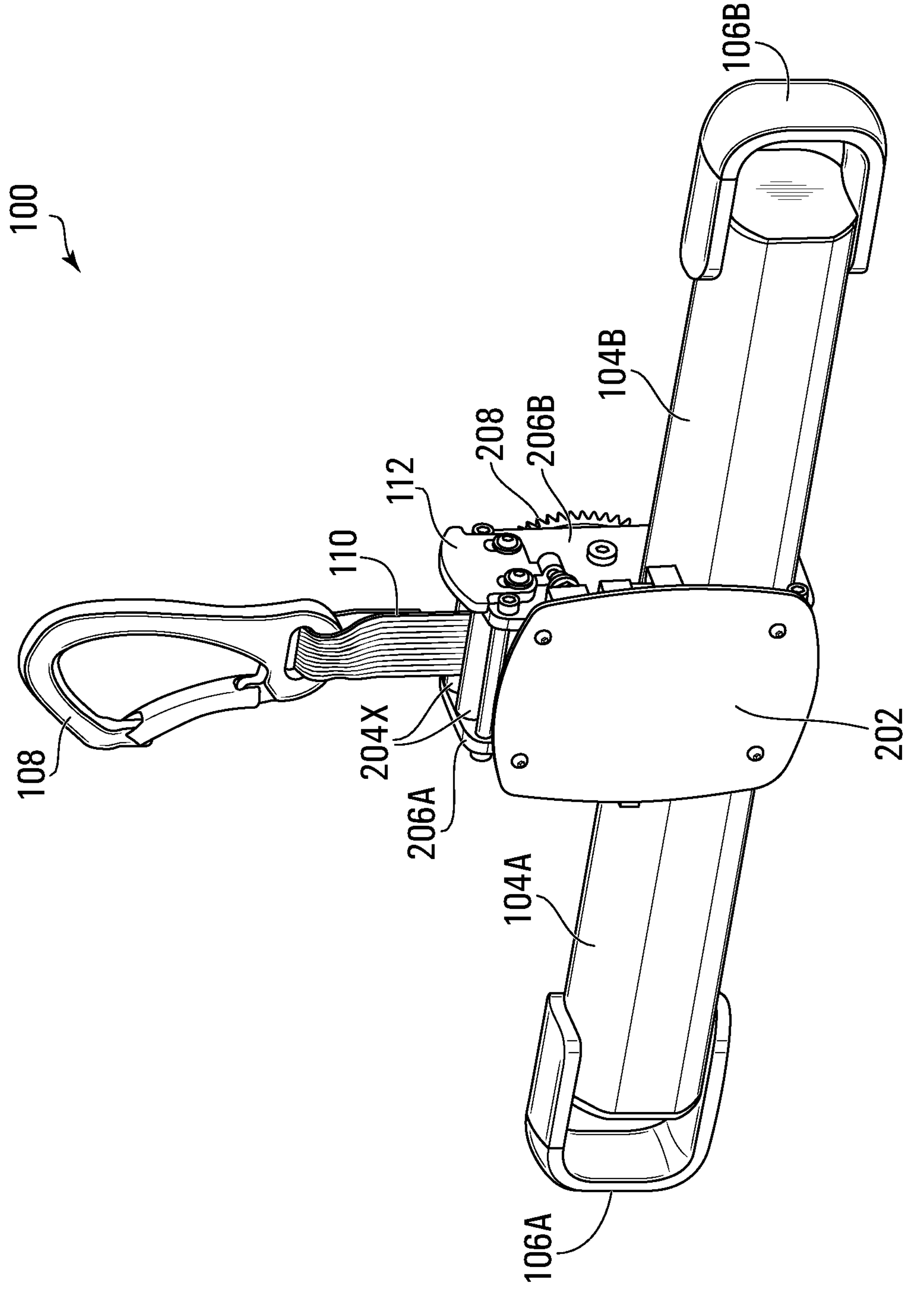
FIG. 2 illustrates, in an anterior perspective view, the patient lift system of FIG. 1, with the housing removed in accordance with an aspect of the present application.

FIG. 2 illustrates, in an anterior perspective view, the patient lift system 100 of FIG. 1, with the housing 102 removed. Removal of the housing 102 exposes a circuit board 202. Removal of the housing 102 also exposes a first side wall 206A of the frame and a second side wall 206B of the frame (collectively or individually 206). The side walls 206 provide support for a first guide roller 204X and a second guide roller 204Y (collectively or individually 204). The guide rollers 204 are positioned such that the strap 110 is guided into the frame by passing between the parallel guide rollers 204.

A portion of a geared spool 208 is evident in FIG. 2. The geared spool 208 is carried on an axle that is supported by the side walls 206.

Figure 3:
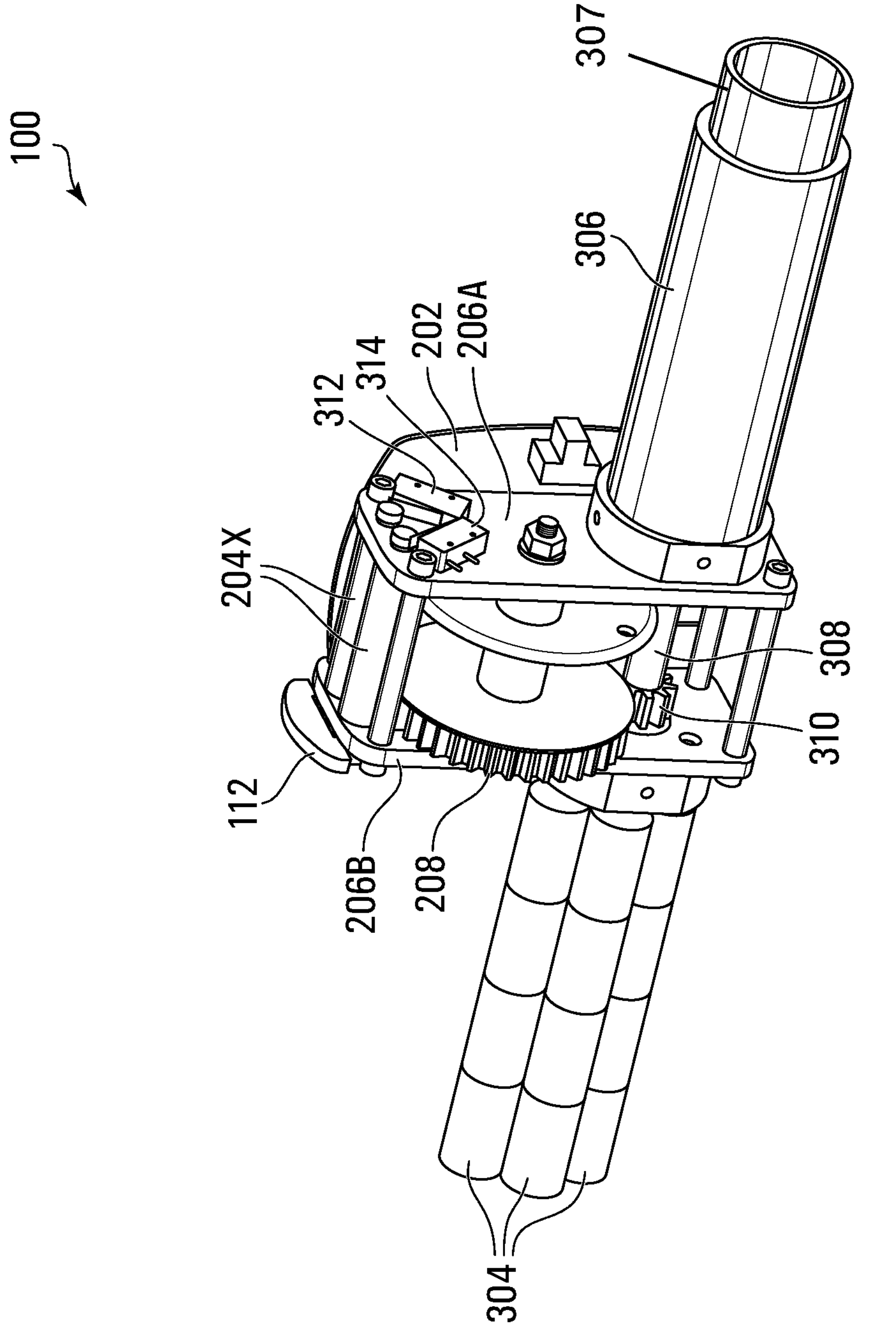
FIG. 3 illustrates, in a posterior perspective view, the patient lift system of FIG. 1, with the housing and the carry bars removed in accordance with an aspect of the present application.

FIG. 3 illustrates, in a posterior perspective view, the patient lift system 100 of FIG. 1, with the housing 102 and the carry bars 104 removed. Removal of the first carry bar 104A exposes a cylindrical case 306 for an electric motor (not shown). Removal of the second carry bar 104B exposes a set of batteries 304. Three batteries 304 are illustrated in FIG. 3. However, it should be clear that the number and configuration of batteries 304 is only restricted by the size and shape of the second carry bar 104B in which the batteries 304 fit. The change of perspective from FIG. 2 (anterior) to FIG. 3 (posterior) exposes a drive shaft 308 that is driven, at a proximal end of the drive shaft 308, by the electric motor and a gear 310 that is mounted to a distal end of the drive shaft 308. The gear 310 is arranged to cooperate with the geared spool 208.

In one aspect of the present application, the electric motor is a direct current (DC) motor that is powered by the batteries 304.

Figure 4:
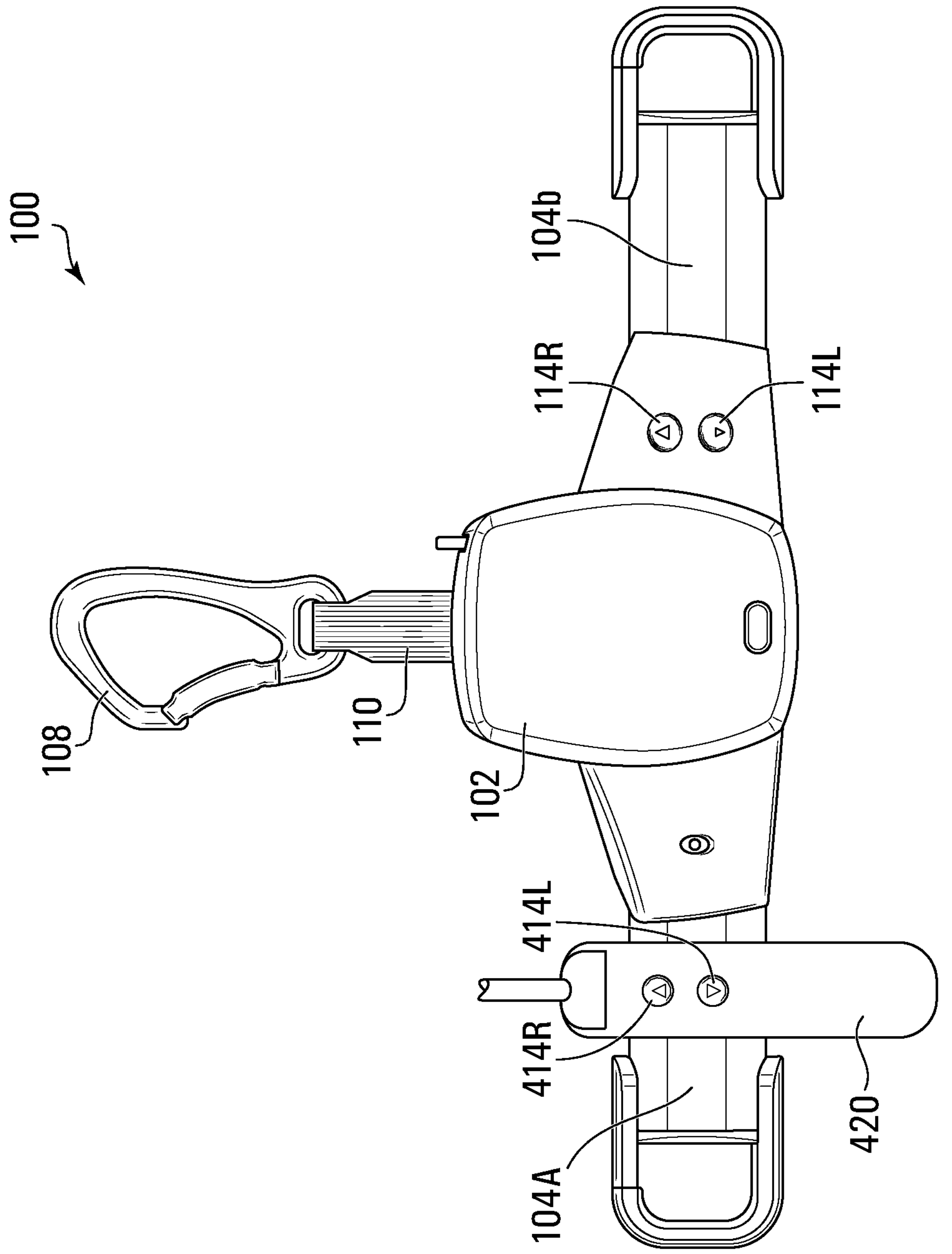
FIG. 4 illustrates, in an anterior elevation view, the patient lift system of FIG. 1, with the addition of a hand control in accordance with an aspect of the present application.

FIG. 4 illustrates, in an anterior elevation view, the patient lift system 100 of FIG. 1, with the addition of a hand control 420. The hand control 420 includes push button controls: a hand control "raise" button 414R; and a hand control "lower" button 414L. The hand control 420 may maintain a wired connection to the circuit board 202 within the housing 102. Alternatively, the hand control 420 may maintain a wireless connection to the circuit board 202 within the housing 102.

In overview, the patient lift system 100 may be seen to help lift and mobilize a disabled person with minimal effort from a caregiver.

The patient lift system 100 may be attached, by the caregiver, to a ceiling-based anchor using the carabiner 108. A sling (not shown) may be attached to the patient lift system 100 at the first carry bar hook 106A and the second carry bar hook 106B.

Notably, through a careful design, the layout of the components (the motor, the batteries 304, etc.) of the patient lift system 100 may be arranged in a manner that establishes that the patient lift system 100 is balanced about a central point.

In operation, the caregiver may control the up/down position of the patient lift system 100 through pressing either the housing "raise" button 114R or the housing "lower" button 114L.

In one instance, control circuitry (not shown) carried, at least in part, on the circuit board 202 receives a signal from the housing "raise" button 114R. Responsive to receiving the signal, the control circuitry may control flow of current from the batteries 304 to the electric motor, thereby causing rotation of the drive shaft 308. Rotation, by the electric motor, of the drive shaft 308 effects rotation of the gear 310, which effects rotation of the geared spool 208 in a direction to spool up the strap 110. Responsive to the geared spool 208 turning in a direction to spool up the strap 110, an amount of the strap 110 on the geared spool 208 is increased, thereby reducing a distance between the carabiner 108 and the housing 102, thereby raising the patient lift system 100, thereby raising a patient in the sling.

In another instance, the control circuitry receives a signal from the housing "lower" button 114L. Responsive to receiving the signal, the control circuitry may control flow of current from the batteries 304 to the electric motor, thereby causing rotation of the drive shaft 308. Rotation, by the electric motor, of the drive shaft 308 effects rotation of the gear 310, which effects rotation of the geared spool 208 in a direction to spool out the strap 110. Responsive to the geared spool 208 turning in a direction to spool out the strap 110, an amount of the strap 110 on the geared spool 208 is decreased, thereby increasing the distance between the carabiner 108 and the housing 102, thereby lowering the patient lift system 100, thereby lowering the patient in the sling.

Although, in the foregoing example, the caregiver used the housing buttons 114R, 114L, the caregiver could equally have used the hand control buttons 414R, 414L.

A motor brake 307 may be attached in line with the electric motor to ensure that the system does not back drive. An "always on" motor brake conveniently would ensure that little to no power is used when the electric motor is not in motion.

Switches ensure the system automatically stops when either of the limits are reached. More particularly, a lower limit switch 312 halts the rotation of the drive shaft 308 by the electric motor, thereby halting the spooling out of the strap 110. Similarly, an upper limit switch 314 halts the rotation of the drive shaft 308 by the electric motor, thereby halting the spooling in of the strap 110.

Tension from the weight of the lift causes the strap to push against one of the limit switches to allow for movement, if this tension is not available either due to the strap extending completely or if the lift reaches a surface to rest on, the switch deactivates resulting in a lower limit condition.

Similarly an upper limit condition occurs when a second switch, in addition to the first already depressed switch, is activated. This is a direct result of the thickening of strap near the upper end of the strap.

In operation, to accomplish an emergency stop, a user presses downwards on the emergency stop plate 112. Conveniently, the switch (not shown) with which the emergency stop plate 112 is associated is a double throw switch with an ON setting, an OFF setting and a momentarily ON setting. Accordingly, while a single downwards press by the user on the emergency stop plate 112 may be used to accomplish an emergency stop, the user may opt to press and hold the emergency stop plate 112 and, thereby, activate an emergency lowering function.

Notably, some known patient lift devices require splitting the lowering function and the emergency stop into two different items: an emergency motor shut off button for turning the motor off and a separate button for lowering. Often, the emergency motor shut off button is located on the side of the patient lift device. Such a location causes a user to push the lift device sideways when operating the emergency motor shut off button.

In further known patient lift devices, a user pulls a strap to effectuate an emergency motor shut off. Some may find such a design to be lacking in ergonomic benefit.

The above-described implementations of the present application are intended to be examples only. Alterations, modifications and variations may be effected to the particular implementations by those skilled in the art without departing from the scope of the application, which is defined by the claims appended hereto.

What is claimed is:

1. A patient lift system comprising:

a housing enclosing a frame;

a spool mounted to the frame;

a strap extending externally of the housing and attached, at a first end, to the spool;

a first carry bar attached to the frame and extending externally of the housing, the first carry bar defining a first carry bar enclosure portion for enclosing a motor having a motor body, the motor body having a longitudinal axis, the first carry bar enclosure portion extending along a first carry bar extension axis;

a drive shaft that is configured to be driven by the motor, the drive shaft having a longitudinal axis; and a second carry bar attached to the frame and extending externally of the housing, the second carry bar defining a second carry bar closure portion for enclosing a power source to provide power to the motor;

a transmission, comprising a transmission component, wherein the transmission component is rotatable about a rotation axis;

wherein:

the motor, the drive shaft, the transmission, and the spool are co-operatively configured such that the spool is drivable, via rotation of the transmission component in response to driving of the drive shaft by the motor, for winding the strap onto the spool, and further drivable, via rotation of the transmission component in response to driving of the drive shaft by the motor, for unwinding the strap from the spool;

the longitudinal axis of the motor body, the first carry bar extension axis, the longitudinal axis of the drive shaft, and the rotation axis are disposed in a parallel relationship.

2. The patient lift system of claim 1, further comprising a ceiling anchor connector that is connected to the second end of the strap and configured for releasably attaching the patient lift system to a ceiling anchor.

3. The patient lift system of claim 1, wherein the motor, the drive shaft, the transmission, and the spool are co-operatively configured such that:

the driving of the spool, for winding the strap onto the spool, is effected via rotation of the spool, in a first direction; and the driving of the spool, for unwinding the strap from the spool, is effected via rotation of the spool, in a second direction, the second direction opposite the first direction.

4. The patient lift system of claim 1, further comprising a circuit board enclosed by the housing, wherein control circuitry is mounted to the circuit board and the control circuitry is configured to control the activation of the motor.

5. The patient lift system of claim 4, further comprising:

a raise button on the housing, wherein actuation of the raise button signals the control circuitry to activate the motor to drive the spool for winding the strap; and a lower button on the housing, wherein actuation of the lower button signals the control circuitry to activate the motor to drive the spool for unwinding the strap.

6. The patient lift system of claim 1, further comprising:

a first carry bar hook at a distal end of the first carry bar; and a second carry bar hook at a distal end of the second carry bar;

wherein the first carry bar hook and the second carry bar hook are co-operatively configured for attaching a patient support thereon.

7. The patient lift system of claim 1, wherein the motor has a brake that is configured to prevent back driving of the motor.

8. The patient lift system of claim 1, further comprising an emergency stop plate that is disposable in:

an emergency stop configuration, for effectuating defeating the driving of the spool; and an emergency lowering configuration, for effectuating the driving of the spool to unwind the strap from the spool.

9. The patient lift system of claim 1, further comprising:

an upper limit switch that is configured to detect that the patient lift system is disposed at an upper limit condition, the detecting of the upper limit condition for effectuating defeating the driving of the spool while the patient lift system is disposed at the upper limit condition; and a lower limit switch that is configured to detect that the patient lift system is disposed at a lower limit condition, the detecting of the lower limit condition for effectuating defeating the driving of the spool while the patient lift system is disposed at the lower limit condition.

10. The patient lift system of claim 1, wherein the transmission component is a gear, and the spool is a geared spool.

11. The patient lift system of claim 1, wherein the first carry bar and the second carry bar extend from the frame in opposite directions.

12. The patient lift system of claim 1, wherein the spool is disposed centrally relative to the patient lift system.

13. The patient lift system of claim 1, wherein a center of gravity of the patient lift system is disposed centrally of the patient lift system.

14. A patient lift system, comprising:

a frame;

a spool rotatably mounted to the frame;

a housing that encloses the frame;

a strap that is attached, at a first end, to the spool, and that extends externally of the housing;

a first carry bar attached to the frame and extending externally of the housing, the first carry bar defining a first carry bar enclosure portion for enclosing a motor having a motor body, the motor body having a longitudinal axis, the first carry bar enclosure portion extending along a first carry bar extension axis;

a drive shaft that is configured to be driven by the motor, the drive shaft having a longitudinal axis; and a second carry bar attached to the frame and extending externally of the housing, the second carry bar defining a second carry bar closure portion for enclosing a power source to provide power to the motor;

a transmission, comprising a transmission component, wherein the transmission component is rotatable about a rotation axis;

wherein:

the motor, the drive shaft, the transmission, and the spool are co-operatively configured such that the spool is drivable in a first direction, via rotation of the transmission component in response to driving of the drive shaft by the motor, for winding the strap onto the spool, and further drivable in a second direction that is opposite the first direction, via rotation of the transmission component in response to driving of the drive shaft by the motor, for unwinding the strap from the spool; and the longitudinal axis of the motor body, the first carry bar extension axis, the longitudinal axis of the drive shaft, and the rotation axis are disposed in a parallel relationship.

15. A method of manufacturing a patient lift system, the method comprising:

enclosing a frame in a housing;

mounting a spool to the frame;

attaching a strap, at a first end, to the spool;

attaching a first carry bar to the frame that extends external to the housing, the first carry bar defining a first carry bar enclosure portion, the first carry bar enclosure portion extending along a first carry bar extension axis;

installing, enclosed within the first carry bar enclosure portion, a motor having a motor body, the motor body having a longitudinal axis;

connecting a drive shaft to the motor such that the drive shaft is drivable by the motor, the drive shaft having a longitudinal axis;

attaching a second carry bar to the frame, the second carry bar defining a second carry bar enclosure portion;

installing, enclosed within the second carry bar enclosure portion, a power source to provide power to the motor;

installing a transmission, comprising a transmission component, wherein the transmission component is rotatable about a rotation axis, to establish operable communication between the drive shaft and the spool;

wherein:

the motor, the drive shaft, the transmission, and the spool are co-operatively configured such that the spool is drivable in a first direction, via rotation of the transmission component in response to driving of the drive shaft by the motor, for winding the strap onto the spool, and further drivable in a second direction that is opposite the first direction, via rotation of the transmission component in response to driving of the drive shaft by the motor, for unwinding the strap from the spool; and the longitudinal axis of the motor body, the first carry bar extension axis, the longitudinal axis of the drive shaft, and the rotation axis are disposed in a parallel relationship.

16. The method of claim 15 further comprising adjusting a disposition of the power source and a disposition of the motor relative to the patient lift system to achieve a center of gravity centrally of the patient lift system.

17. The patient lift system of claim 1, wherein:

the enclosure of the motor by the first carry bar enclosure portion is such that the motor is disposed externally of the frame; and the enclosure of the power source by the second carry bar enclosure portion is such that the power source is disposed externally of the frame.

18. The patient lift system of claim 1, wherein:

the transmission component is a first transmission component, and the rotation axis is a first rotation axis, the transmission further comprising a second transmission component, wherein the second transmission component is rotatable about a second rotation axis;

wherein:

the motor, the drive shaft, the transmission, and the spool are co-operatively configured such that the spool is drivable, via rotation of the first transmission component and the second transmission component in response to driving of the drive shaft by the motor, for winding the strap onto the spool, and further drivable, via rotation of the first transmission component and the second transmission component in response to driving of the drive shaft by the motor, for unwinding the strap from the spool; and the longitudinal axis of the motor body, the first carry bar extension axis, the longitudinal axis of the drive shaft, the first rotation axis, and the second rotation axis are disposed in a parallel relationship.

19. The patient lift system of claim 1, wherein:

the transmission component is a first transmission component;

the transmission comprises a plurality of transmission components, the plurality of transmission components including the first transmission component;

for each one of the transmission components of the plurality of transmission components, independently, the transmission component is rotatable about a respective rotation axis;

wherein:

the motor, the drive shaft, the transmission, and the spool are co-operatively configured such that the spool is drivable, via rotation of the plurality of transmission components in response to driving of the drive shaft by the motor, for winding the strap onto the spool, and further drivable, via rotation of the plurality of transmission components in response to driving of the drive shaft by the motor, for unwinding the strap from the spool; and the longitudinal axis of the motor body, the first carry bar extension axis, the longitudinal axis of the drive shaft, the first rotation axis, and the respective rotation axis of each one of the transmission components of the plurality of transmission components are disposed in a parallel relationship.

20. The patient lift system of claim 1, wherein:

the second carry bar enclosure portion extends along a second carry bar extension axis; and the first carry bar extension axis and the second carry bar extension axis are disposed in a parallel relationship.

21. The patient lift system of claim 1, wherein:

the motor is a planetary motor.

22. The patient lift system of claim 1, wherein:

the longitudinal axis of the drive shaft extends through the center of gravity of the patient lift system.

* * * * *